US 12,542,980 B2

(12) United States Patent
Moradi Khanshan et al.

(10) Patent No.: US 12,542,980 B2
(45) Date of Patent: Feb. 3, 2026

(54) PIXEL SUBSTRATE AND LIGHT RECEIVING APPARATUS

(71) Applicant: Sony Semiconductor Solutions Corporation, Atsugi (JP)

(72) Inventors: Tohid Moradi Khanshan, Stuttgart (DE); Naoki Kawazu, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 176 days.

(21) Appl. No.: 18/277,772

(22) PCT Filed: Feb. 17, 2022

(86) PCT No.: PCT/EP2022/053935
§ 371 (c)(1),
(2) Date: Aug. 18, 2023

(87) PCT Pub. No.: WO2022/179929
PCT Pub. Date: Sep. 1, 2022

(65) Prior Publication Data
US 2024/0137668 A1 Apr. 25, 2024
US 2024/0236524 A9 Jul. 11, 2024

(30) Foreign Application Priority Data

Feb. 26, 2021 (EP) ..................... 21159717

(51) Int. Cl.
*H04N 25/709* (2023.01)
*H04N 25/703* (2023.01)
*H04N 25/77* (2023.01)

(52) U.S. Cl.
CPC .......... *H04N 25/709* (2023.01); *H04N 25/77* (2023.01)

(58) Field of Classification Search
CPC .... H04N 25/709; H04N 25/77; H04N 25/703; H10F 39/18; H10F 39/80; H10F 39/8023; H10F 39/8027; H10F 39/37; H10D 89/813
See application file for complete search history.

(56) References Cited

U.S. PATENT DOCUMENTS

| | | | | |
|---|---|---|---|---|
| 5,657,139 A | * | 8/1997 | Hayashi | ............ G02F 1/136204 349/40 |
| 2002/0063296 A1 | * | 5/2002 | Kitagawa | ............. H10D 84/811 257/369 |

(Continued)

FOREIGN PATENT DOCUMENTS

| | | |
|---|---|---|
| EP | 3745710 A1 | 12/2020 |
| WO | 2004/019609 A2 | 3/2004 |

OTHER PUBLICATIONS

International Search Report and Written Opinion mailed on Jun. 3, 2022, received for PCT Application PCT/EP2022/053935, filed on Feb. 17, 2022, 9 pages.

*Primary Examiner* — Marly S Camargo
(74) *Attorney, Agent, or Firm* — XSENSUS LLP

(57) ABSTRACT

A pixel substrate includes a photoelectric conversion element. The photoelectric conversion element includes a doped region and a substrate region. The doped region and the substrate region form a pn junction. A pixel circuit is electrically connected to a first supply line and the photoelectric conversion element. A protection circuit is configured to short-circuit the first supply line and the substrate region when a voltage difference between the first supply line and the substrate region falls below a negative threshold voltage.

20 Claims, 13 Drawing Sheets

(56) References Cited

U.S. PATENT DOCUMENTS

| | | | |
|---|---|---|---|
| 2004/0036786 A1* | 2/2004 | Takayanagi | H04N 25/626 |
| | | | 348/308 |
| 2004/0046101 A1* | 3/2004 | Nakamura | H04N 25/575 |
| | | | 250/200 |
| 2008/0018765 A1 | 1/2008 | Choi et al. | |
| 2010/0194956 A1 | 8/2010 | Yuan et al. | |
| 2010/0264493 A1* | 10/2010 | Izutsu | H10D 30/0221 |
| | | | 257/355 |
| 2014/0014823 A1 | 1/2014 | Araki et al. | |
| 2020/0236941 A1* | 7/2020 | Dukuoka | H10F 39/802 |
| 2020/0358977 A1* | 11/2020 | Niwa | H04N 25/79 |

* cited by examiner

PIXEL SUBSTRATE AND LIGHT RECEIVING APPARATUS

CROSS-REFERENCE TO RELATED APPLICATIONS

The present application is based on PCT filing PCT/EP2022/053935, filed Feb. 17, 2022, and claims priority from European Patent Application No. 21159717.4, filed Feb. 26, 2021, the entire contents of each are incorporated herein by reference.

FIELD OF THE INVENTION

The present disclosure relates to a pixel substrate and to a light-receiving apparatus such as a solid-state imaging device and a distance measuring apparatus. In particular, the present disclosure is related to pixel substrates with active pixel sensors for image intensity detection, event detection, and/or distance measuring.

BACKGROUND

An active pixel sensor (pixel) includes a photoelectric conversion element and an active pixel circuit. The photoelectric conversion element converts electromagnetic radiation impinging onto a detection area into an electronic sensor signal, e.g. a photocurrent.

The active pixel circuit sets the operation mode for the photoelectric conversion element and determines which information conveyed by the incoming radiation is exploited and transmitted to a target device receiving and processing a pixel signal output by the active pixel sensor. For example, the active pixel circuit may be capable of facilitating radiation intensity processing, detection of radiation intensity changes, and/or detection of single events, e.g. for time-of-flight distance measurements. Accordingly, the active pixel circuit outputs a pixel signal that may contain information about the intensity of the incoming radiation and/or about the degree to which the incoming radiation changes. Alternatively or in addition, the active pixel circuit may simply indicate whether or not radiation has been received or when radiation has been received.

A light receiving apparatus such as a solid-state imaging device or a distance measuring apparatus may include a pixel substrate and a logic substrate. The pixel substrate integrates a plurality of active photoelectric conversion elements and, if applicable, at least some elements of the active pixel circuits. The logic substrate may include logic circuits that receive and process the electric signals output by the active pixel circuit and, if applicable, further elements of the active pixel circuits.

It is desirable to increase reliability of pixel substrates and light receiving apparatuses and to simplify the integration of a pixel substrate and a logic substrate in a light receiving apparatus.

SUMMARY OF INVENTION

A pixel substrate includes one or more photoelectric conversion elements, at least some elements of one or more active pixel modules, and at least two electric terminals as electric interface to a logic substrate. Through a first supply terminal the pixel substrate may receive a positive supply voltage for the elements of the active pixel modules formed on the pixel substrate. A reference voltage terminal may pass a reference voltage between the pixel substrate and the logic substrate. A signal output terminal passes an output signal from the pixel substrate to the logic substrate. When the pixel substrate is powered on, a positive supply voltage is supplied from the logic substrate to the pixel substrate through the first supply terminal.

When the logic substrate does not supply the positive supply voltage, the pixel substrate is powered off. When the pixel substrate is powered off and radiation impinges on detection areas of the photoelectric conversion elements, electric potential differences may occur between terminals of the pixel substrate. The present embodiments mitigate shortcomings of conventional pixel substrates in that a protection circuit limits a voltage appearing between the first supply terminal and the reference voltage terminal when the pixel substrate is powered off and at the same time radiation impinges on the detection area.

Accordingly, a pixel substrate according to the present disclosure includes a photoelectric conversion element, a pixel circuit and a protection circuit. The photoelectric conversion element includes a doped region and a substrate region, wherein the doped region and the substrate region form a pn junction. The pixel circuit is electrically connected to a first supply line and to the photoelectric conversion element. The protection circuit is configured to short-circuit the first supply line and the substrate region when a voltage difference between the first supply line and the substrate region falls below a negative threshold voltage.

In particular, the first supply line may be electrically connected to a first supply terminal, the substrate region may be electrically connected to a voltage reference terminal, and a voltage between the first supply line and the voltage reference terminal may fall below the negative threshold voltage when the pixel substrate is powered off and at the same time radiation impinges onto the photoelectric conversion element.

The photocurrent through the photoelectric conversion element and/or the charge transfer induced by the photocurrent may have the effect that at least one circuit element electrically connected in series between the first supply line and the photoelectric conversion element at least partly turns on and a negative quiescent voltage is present between the first supply terminal and the voltage reference terminal. The negative voltage may damage circuit elements formed on the logic substrate and/or may complicate the adaption of the logic substrate to the pixel substrate.

In the pixel circuit of the present disclosure, when the pixel substrate is powered off and at the same time radiation impinges onto the photoelectric conversion element, the protection circuit short-circuits the first supply line and the substrate region when the voltage between the first supply line and the substrate region falls below a negative threshold voltage. The protection circuit may be self-powered.

DETAILED DESCRIPTION

Embodiments for implementing techniques of the present disclosure (hereinafter referred to as "embodiments") will be described below in detail using the drawings. The techniques of the present disclosure are not limited to the embodiments, and various numerical values and the like in the embodiments are illustrative. In the following description, the same elements or elements with the same functions are denoted by the same reference signs, and duplicate descriptions are omitted.

Electrically connected electronic elements may be electrically connected through a direct, permanent low-resistive connection, e.g., through a conductive line. The term "electrically connected" may also include a connection through other electronic elements provided and suitable for permanent and/or temporary signal transmission and/or transmission of energy. For example, electronic elements may also be electrically connected through electronic switches such as transistors or transistor circuits, e.g. MOSFETs, transmission gates, and others.

Figure 1:
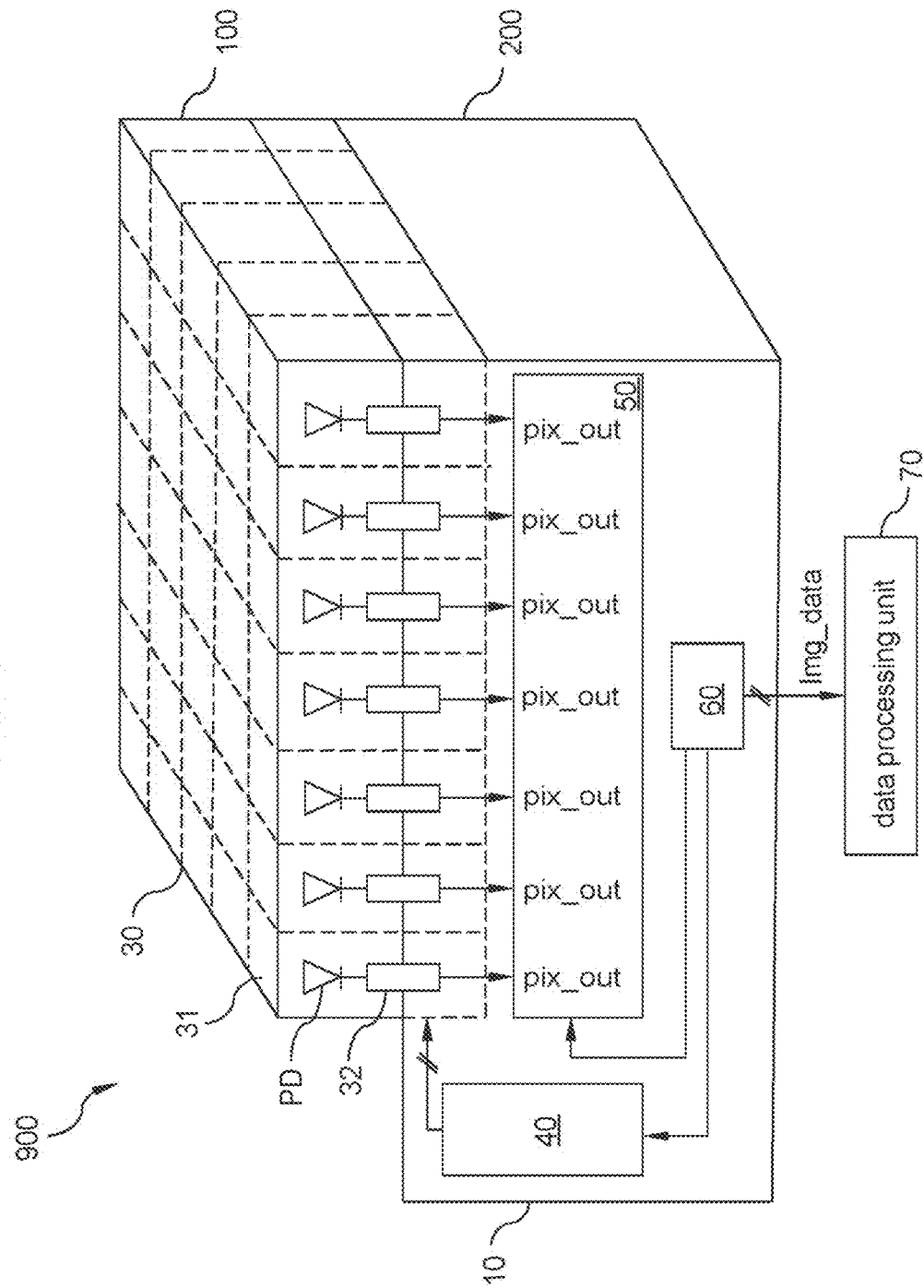
FIG. 1 is a simplified block diagram of a light receiving apparatus including a pixel substrate with active pixel sensors according to the present disclosure.

FIG. 1 illustrates a configuration example of an image sensor assembly 10 of a light receiving apparatus 900 according to an embodiment of the present technology. The light receiving apparatus 900 may be or may include a solid-state imaging device and/or a distance measuring apparatus. The image sensor assembly 10 may include a pixel substrate 100 and a logic substrate 200.

The image sensor assembly 10 includes a pixel array 30 with one or more active pixels 31, wherein each active pixel 31 includes a photoelectric conversion element PD and an active pixel module 32 electrically connected to at least one of the photoelectric conversion elements PD. Each active pixel 31 has a detection area that receives radiation, e.g. visible light, infrared radiation or ultraviolet radiation Each active pixel 31 outputs a pixel output signal pix_out indicative for the incoming radiation.

The pixel array 30 may include one single active pixel 31 or may be a one-dimensional pixel array with the photoelectric conversion elements PD of all active pixels 31 arranged along a straight or meandering line (line sensor) in the pixel substrate 100. In particular, the pixel array 30 may be a two-dimensional array, wherein the photoelectric conversion elements PDs of the active pixels 31 may be arranged along straight or meandering rows and along straight or meandering lines in a horizontal plane of the pixel substrate 100. The illustrated embodiment shows a two dimensional array of photoelectric conversion elements PD arranged along straight rows and along straight columns running orthogonal to the rows.

The photoelectric conversion elements PD may be photodiodes capable of being operated in a proportional mode or PADs capable of being operated in an avalanche mode. Each active pixel module 32 may be capable of operating the photoelectric conversion element PD as intensity output pixel, as DVS (dynamic vision sensor) pixel or as PAD, e.g. as SPAD pixel for event detection.

Each active pixel module 32 may include at least one amplifying circuit and may generate one or more pixel output signals pix_out. A pixel output signal pix_out may contain a voltage signal indicating the intensity of the radiation received by the photoelectric conversion element PD of the active pixel 31. Alternatively or in addition, the pixel output signal pix_out may indicate a change of the radiation intensity detected by the active pixel 31. Alternatively or in addition, the pixel output signal pix_out may indicate an event detected by the active pixel 31. For example, the pixel array 30 may also be configured to be operated as the sensor side of a ToF (time-of-flight) sensor.

The pixel substrate 100 includes at least the photoelectric conversion elements PD. In addition to the photoelectric conversion elements PD, the pixel substrate 100 may include a pixel circuit. Each pixel circuit includes one or more circuit elements of an active pixel module 32 or may include the complete active pixel module 32. In particular, the pixel circuit on the pixel substrate 100 may include at least one circuit element of each active pixel module 32, e.g. an MOSFET, wherein the circuit element is electrically connected between a first supply line and the photoelectric conversion element PD.

According to another example, the pixel circuit on the pixel substrate 100 may include only the photoelectric conversion element PD and a logic substrate combined with the pixel substrate 100 may include the pixel circuit, wherein the pixel circuit includes at least one circuit element, e.g. an MOSFET, that is electrically connected between a first supply line and the photoelectric conversion element PD.

The image sensor assembly 10 further includes an address/driver unit 40 that generates and drives control signals for the active pixel modules 32. Each control signal may be applied to a single active pixel module 32, to a group of active pixel modules 32, e.g. to all active pixel modules 32 in the same row or in the same column, or to all active pixel modules 32 of the image sensor assembly 10.

A readout circuit 50 integrated in the image sensor assembly 10 may receive the pixel output signals pix_out output by the pixel array 30. The image sensor assembly 10 may further include a controller 60 for controlling the address/driver unit 40 and/or the readout circuit 50 according to a process-controlled and/or time-controlled sequential control. The controller 60 may pre-process the pixel output signals pix_out and may pass image information img_data based on the pixel output signals pix_out to an external image data processing unit 70.

In addition, the image sensor assembly 10 includes a protection circuit as described in more detail below.

Figure 2A:
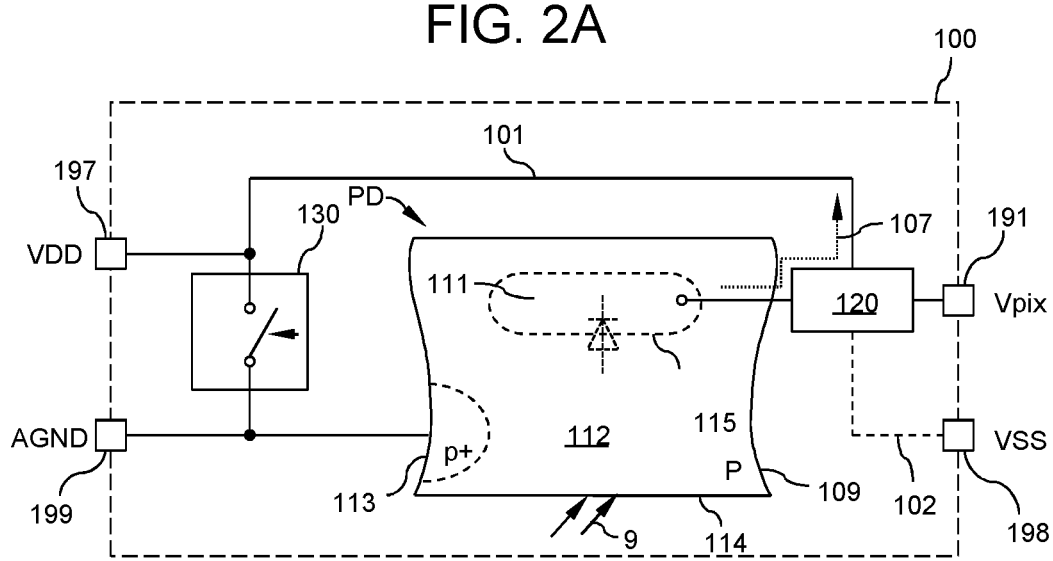
FIG. 2A combines a simplified block diagram and a simplified vertical cross-sectional view of a portion of a pixel substrate according to the present disclosure.

FIG. 2A schematically shows functional blocks of a pixel substrate 100 in combination with a vertical cross-section of a detector portion 109 of the pixel substrate 100. The pixel substrate 100 may be or may include a semiconductor portion, e.g. a thin slice or layer of monocrystalline silicon.

The pixel substrate 100 includes a photoelectric conversion element PD with a doped region 111 and a substrate region 112. The doped region 111 and the substrate region 112 form a pn junction 115.

The substrate region 112 may be p-conductive. The doped region 111 may be n-conductive. Radiation 9 entering through a detection area 114 of the pixel substrate 100 induces charge-carrier separation in a depletion region on both sides of the pn junction 115, wherein holes move toward the p-conductive substrate region (anode region) and electrons move toward the n-conductive doped region 111 (cathode region).

The pixel substrate 100 further includes a pixel circuit 120 electrically connected to a first supply line 101 and to the photoelectric conversion element PD.

The first supply line 101 electrically connects the pixel circuit 120 with one or more first supply terminals 197. Through the one or more first supply terminals 197 a first supply voltage is passed to the pixel substrate 100. The first supply voltage may be a positive supply voltage VDD.

The pixel circuit 120 may include at least one circuit element of an active pixel module that converts the charge accumulated in the doped region 111 and/or a photocurrent induced by the photoelectric conversion element PD into a pixel output signal pix_out.

For example, the active pixel module may include an intensity read-out circuit converting at predetermined points in time charge accumulated in the doped region 111 into a pixel output signal pix_out with a voltage level proportional to the amount of charge stored in the doped region 111 at the predetermined points in time.

Alternatively or in addition, the active pixel module may include an intensity change detection circuit that outputs a pixel output signal pix_out indicating a change of a photocurrent through the photoelectric conversion element PD by at least a threshold value.

Alternatively or in addition, the active pixel module may include an event detection circuit that outputs a pixel output signal pix_out indicating whether or not the photoelectric conversion element PD detects radiation. For example, the active pixel module may apply a bias voltage across the photoelectric conversion device PD and indicates an avalanche breakdown in the photoelectric conversion device PD.

The pixel circuit 120 may include at least one amplifying element electrically connected between the first supply line 101 and the photoelectric conversion element PD. For example, the pixel circuit 120 may include an MOSFET with a source/drain path electrically connected between the first supply line 101 and the photoelectric conversion element PD.

The pixel substrate 100 may further include a protection circuit 130 that short-circuits the first supply line 101 and the substrate region 112 when a voltage between the first supply line 101 and the substrate region 112 falls below a negative threshold voltage.

When a positive supply voltage VDD is externally applied between the first supply terminal 197 and the substrate region 112, the pixel substrate 100 is powered on and the pixel circuit 120 is operative. When radiation 9 enters the pixel substrate 100 through the detection area 114, the pixel circuit 120 processes the charge stored in the doped region 111 and/or a photocurrent driven by the photoelectric conversion device PD.

When no supply voltage is externally applied between the first supply terminal 197 and the substrate region 112, the pixel substrate 100 is powered off. The pixel circuit 120 is not operative. Instead, the pixel circuit 120 may pass charge carriers (electrons) generated by the radiation 9 entering in the detection area 114 through an off-state charge carrier path 107 to the first supply line 101 and to the first supply terminal 197. The off-state charge carrier path 107 may include leakage paths, e.g. through the source/drain path of an MOSFET of the pixel circuit 120.

As a result, a quiescent voltage of several 100 mV may drop between the substrate region and the first supply terminal 197 in the power-off state of the pixel substrate 100. The quiescent voltage may damage other circuit elements inside and/or outside the pixel substrate 100.

The protection circuit 130, which short-circuits the first supply line 101 and the substrate region 112 when a voltage between the first supply line 101 and the substrate region 112 falls below a negative threshold voltage, limits the quiescent voltage, e.g. to a voltage smaller than 100 mV. The protection circuit 130 reduces the risk for damaging electronic circuits electrically connected to the first supply terminal 197.

The pixel substrate 100 may include a plurality of doped regions 111 and pixel circuits 120, wherein for each pixel circuit 120, the pixel substrate 100 may include a signal output terminal 191 electrically connected to the pixel circuit 120. The signal output terminal 191 passes a pixel signal Vpix to the logic substrate. The pixel signal Vpix may be identical with the pixel output signal pix_out, for example if the pixel circuit 120 includes a complete active pixel module.

The pixel substrate 100 may include one or more voltage reference terminals 199 electrically connected to the substrate region 112 through one or more low-resistive ohmic connections. For example, the pixel substrate 100 may include a heavily doped substrate contact region 113. The substrate region 112 and the substrate contact region 113 are in direct contact with each other and form a unipolar junction. The dopant concentration in the substrate contact region 113 is sufficiently high such that the substrate contact region 113 and the voltage reference terminal 199 or the substrate contact region 113 and a metal line in contact with the voltage reference terminal 199 form an ohmic contact.

When a positive supply voltage VDD is externally applied between the first supply terminal 197 and the voltage reference terminal 199 and/or between the first supply terminal 197 and a second supply terminal 198, the pixel substrate 100 is powered on and the pixel circuit 120 is operative.

When no supply voltage is externally applied between the first supply terminal 197 and the voltage reference terminal 199 and/or between the first supply terminal 197 and a second supply terminal 198, the pixel substrate 100 is powered off and the pixel circuit 120 is not operative.

The protection circuit 130 short-circuits the first supply terminal 197 and the voltage reference terminal 199 when a voltage between the first supply terminal 197 and the voltage reference terminal 199 falls below a negative threshold voltage. The protection circuit 130 limits a quiescent voltage between the first supply terminal 197 and the voltage reference terminal 199 to a voltage smaller than 100 mV. The protection circuit 130 reduces the risk for damaging electronic circuits electrically connected to the first supply terminal 197 and the voltage reference terminal 199.

The pixel circuit 120 may also be electrically connected to a second supply line 102, wherein the second supply line 102 and the substrate region 112 may be electrically disconnected. The second supply line 102 may electrically connect the pixel circuits 120 with one or more second supply terminals 198.

The terminals 191, 197, 198, 199 may include metallic structures, e.g. contact pads formed on at least one surface of the pixel substrate 100 and/or through via contacts extending from one side of the pixel substrate 100 to the opposite side.

Figure 2B:
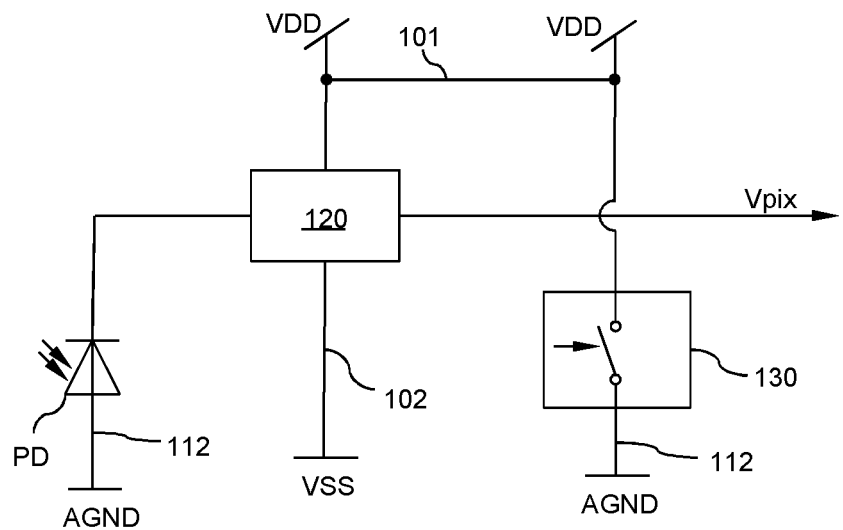
FIG. 2B is a simplified circuit diagram of a pixel circuit combined with a protection circuit according to the present disclosure.

FIG. 2B shows a circuit diagram for the electronic parts of the pixel substrate 100 in FIG. 2A. The photoelectric conversion element PD is represented by a photodiode. The photodiode cathode is electrically connected with the pixel circuit 120. The photodiode anode is electrically connected with the substrate region 112. When powered on, a positive supply voltage VDD may be externally applied to the first supply terminals 197. An analog ground potential AGND may be passed through the voltage reference terminals 197. A negative supply voltage VSS may be externally applied through optional second supply terminals 198.

Figure 3:
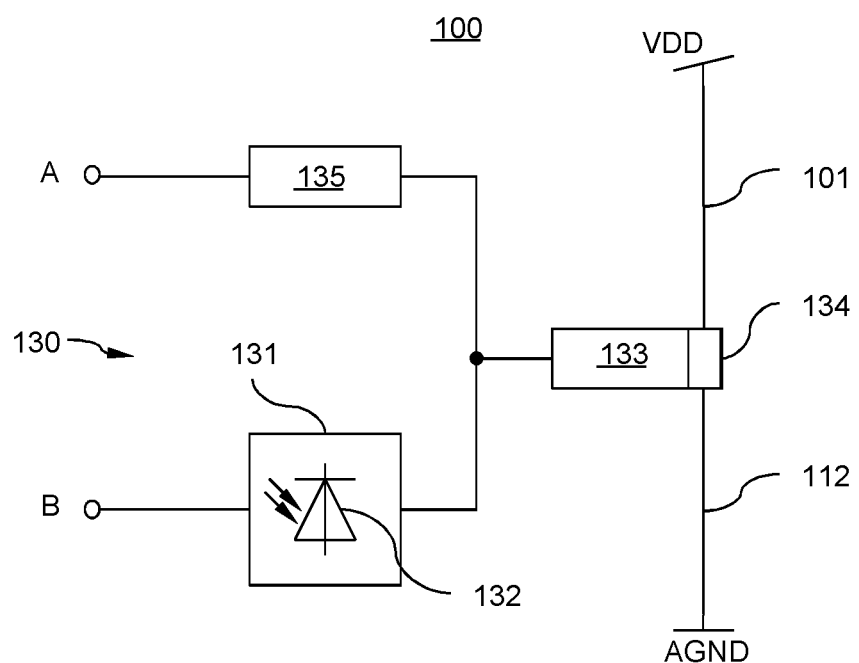
FIG. 3 is a simplified block diagram of a protection circuit according to the present disclosure.
Figure 4:
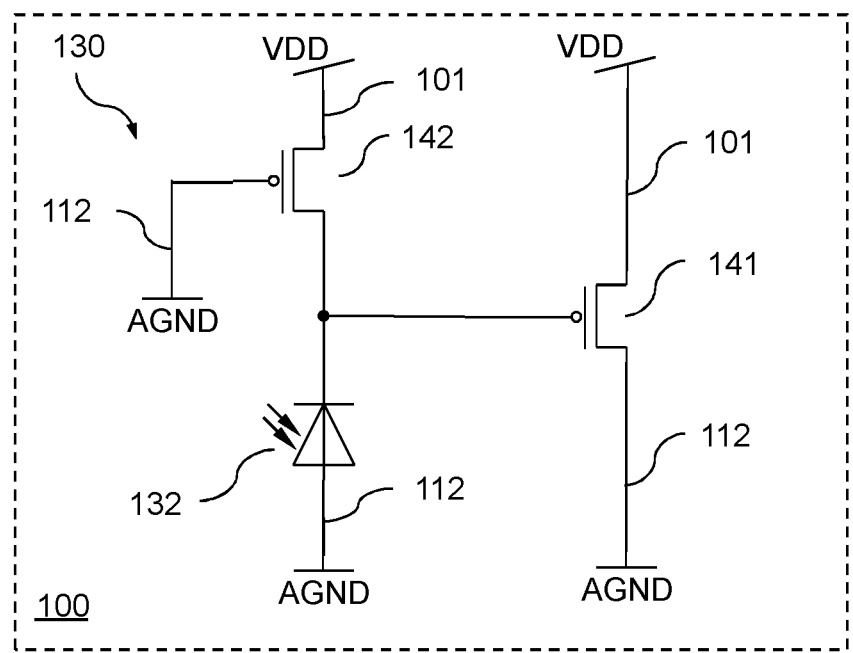
FIGS. 4 and 5 are simplified circuit diagrams of protection circuits with p-channel MOSFETs (metal oxide semiconductor field effect transistors) according to the present disclosure.
Figure 5:
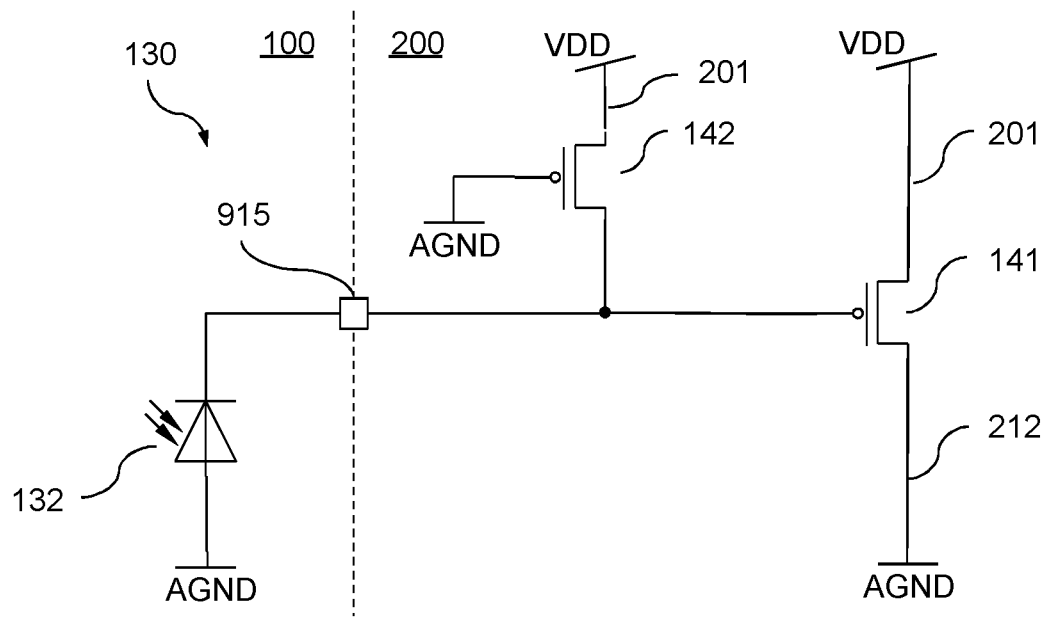

FIGS. 3, 4, and 5 refer to embodiments of protection circuits 130 completely or partly formed in a pixel substrate.

The protection circuit 130 may include a photoelectric current source 131 and a main transistor circuit 133 with a switchable current path 134 between the first supply line 101 and the substrate region 112. A positive supply voltage VDD supplied to the first supply line 101 and analog ground potential AGND applied to the substrate region 112 power on the pixel substrate. The photoelectric current source 131 is capable of switching on the switchable current path 134 when the pixel substrate is powered off and a voltage difference between the first supply line 101 and the substrate region 112 falls below a negative threshold voltage.

The main transistor circuit 133 may include one single n-channel MOSFET or one single p-channel MOSFET, e.g., MOSFETs of the enhancement type. Alternatively, the main transistor circuit 133 may include more than one MOSFET, e.g. two or more MOSFETs electrically connected with the source/drain paths in parallel or MOSFETs in a cascode configuration.

The main transistor circuit 133 may be capable of draining the total quiescent current of all photoelectric conversion elements PD formed in the pixel substrate 100 when illuminated with 5000 lux without being damaged. For example, the main transistor circuit 133 may permanently drain at least 1 mA, for example at least 5 mA or at least 10 mA.

The photoelectric current source 131 may include a photodiode element 132. The amount of energy harvested by the photodiode element 132 may be sufficient to turn on the main transistor circuit 133 such that the protection circuit 130 may be fully self-powered.

The photodiode element 132 may have the same configuration as the photoelectric conversion element PD of the active pixel or may have a different configuration. For example, a vertical dopant profile through a cathode region of the photoelectric conversion element PD of the active pixel may be the same as or may be similar to a vertical dopant profile through a cathode region of the photodiode element 132. The photodiode element 132 may be a one part element with one continuous cathode region or may include several laterally separated parts with laterally separated cathode sections.

A total horizontal area of the photodiode element 132 may be smaller than a total horizontal area of one single photoelectric conversion element PD in the same pixel substrate 100.

For example, a total horizontal area of the photodiode element 132 may be at most 95%, at most 90%, at most 80, at most 50% or at most 10% of the horizontal area of the photoelectric conversion element PD. The photodiode element 132 may be capable of supplying a current of 0.1 to 1 nA at an illumination with 100 klux.

The protection circuit 130 may further include an auxiliary transistor circuit 135 configured to switch off the switchable current path 134 when a voltage difference between the first supply line 101 and the substrate region 112 is above the negative threshold voltage, e.g. positive, irrespective of any amount of charge accumulated in the cathode region of the photodiode element 132. In particular, the auxiliary transistor circuit 135 turns off the switchable current path 134 when the positive supply voltage VDD is supplied to the first supply line 101 and the substrate region 112 is connected to the analog ground potential AGND.

The auxiliary transistor circuit 135 may include one single n-channel MOSFET or one single p-channel MOSFET, e.g., MOSFETs of the enhancement type. Alternatively, the auxiliary transistor circuit 135 may include more than one MOSFET, e.g. two or more MOSFETs electrically connected with the source/drain paths in parallel or MOSFETs in a cascode configuration.

The auxiliary transistor circuit 135 is electrically connected between a first power rail A and a control input of the main transistor circuit 133. The photoelectric current source 131 is electrically connected between a second power rail B and the control input of the main transistor circuit 133. To a first one of the first and second power rails A, B the positive supply voltage VDD is supplied. A second one of the first and second power rails A, B may be connected to analog ground potential AGND or a negative supply voltage.

The pixel substrate 100 may include one single protection circuit 130 or a plurality of protection circuits 130 with the switchable current paths 134 electrically connected in parallel to each other.

The main transistor circuit 133 may include one single first field effect transistor 141. The auxiliary transistor circuit 135 may include a second field effect transistor 142. The first field effect transistor 141 and the second field effect transistor 142 may have the same channel type.

Each of FIGS. 4 and 5 shows a protection circuit 130 with the first field effect transistor 141 and the second field effect transistor 142 formed as p-channel MOSFETs. The photoelectric current source 131 is electrically connected between the gate of the first field effect transistor 141 and the substrate region 112. A source/drain path of the second field effect transistor 142 is electrically connected between the first supply line 101 and the gate of the first field effect transistor 141. A gate of the second field effect transistor 142 is electrically connected to the substrate region 112.

The photoelectric current source includes a photodiode element 132. The photodiode anode is electrically connected to the substrate region 112. The photodiode cathode is electrically connected with the gate of the first field effect transistor 141.

When the pixel substrate 100 is powered on, the positive supply voltage VDD is externally supplied to the first supply line 101 through a first supply terminal. In this case, the analog ground potential AGND at the gate turns on the second p-channel MOSFET 142 such that the second p-channel MOSFET 142 supplies a positive voltage to the gate of the first p-channel MOSFET 141. The positive gate voltage safely turns off the first p-channel MOSFET 141.

When the pixel substrate 100 is powered off, no positive supply voltage is applied externally to the first supply line 101. In this case, the analog ground potential AGND at the gate does not turn on the second p-channel MOSFET 142. When radiation impinges on the photodiode element 132, electrons accumulate at the cathode side and negatively bias the gate of the p-channel MOSFET 141. When the gate bias falls below the negative threshold voltage of the p-channel MOSFET 141, the p-channel MOSFET 141 turns on and switches the first supply line 101 to the analog ground potential AGND. In this way, the protection circuit 130 limits the quiescent voltage between the first supply line 101 and the substrate region 112.

In FIG. 4, the protection circuit 130 is formed completely on the pixel substrate 100. In other words, the pixel substrate 100 includes the complete protection circuit 130.

In FIG. 5 only the photodiode element 132 is formed on the pixel substrate 100. The first and second p-channel MOSFETS 141, 142 are formed on a logic substrate 200. One or more through contact vias 915 may pass the charge accumulated on the cathode of the photodiode element 132 to the logic substrate 200.

The logic substrate 200 may include a first supply rail 201, to which the positive supply voltage VDD is applicable, and a reference voltage rail 212, to which the analog ground potential AGND is applicable. The logic substrate 200 may pass the positive supply voltage VDD on the first supply rail 201 to the first supply line of the pixel substrate 100 through a further through contact via. Another through contact via may pass the analog ground potential AGND between the pixel substrate 100 and the reference voltage rail 212 of the logic substrate 200.

In the alternative to the example shown in FIG. 4 and FIG. 5, the protection circuit 130 may include n channel MOSFETs in appropriate electrical connection, instead of the p channel MOSFETs in FIG. 4 and FIG. 5. In such case, the photodiode element 132 may be or may include a hole accumulation diode with the cathode connected to the first supply line 101.

The pixel substrate 100 may include a plurality of photoelectric conversion elements PD and pixel circuits 120, wherein each pixel circuit 120 may be electrically connected with one, two or more of the photoelectric conversion elements PD. The pixel substrate 100 may include one single protection circuit 130 or more than one protection circuit 130.

Figure 6A:
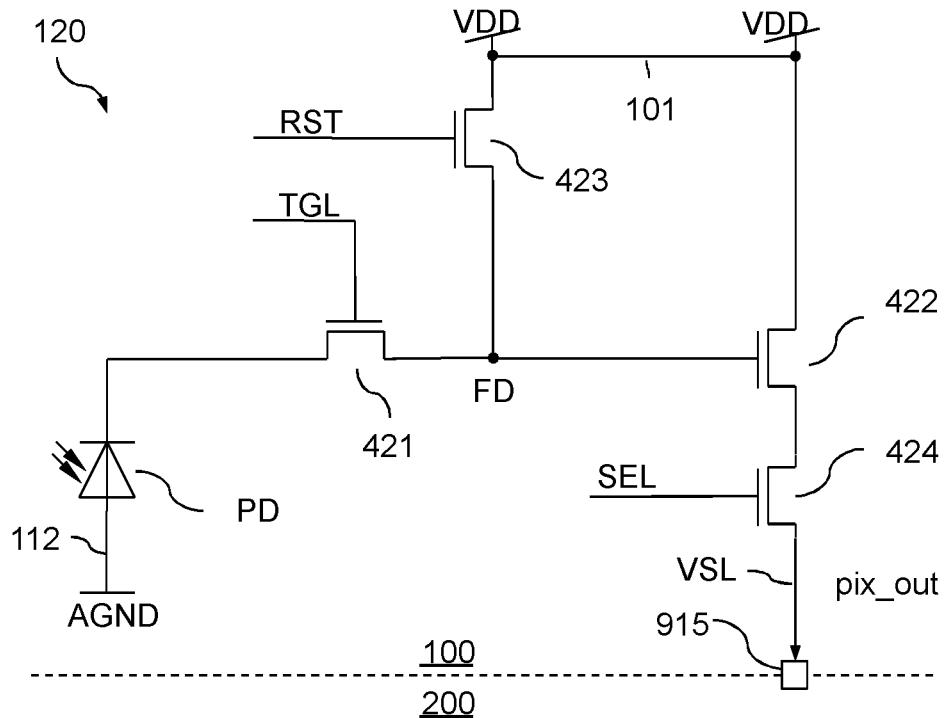
FIGS. 6A and 6B are simplified circuit diagrams of pixel circuits for intensity detection combinable with a protection circuit according to the present disclosure.
Figure 6B:
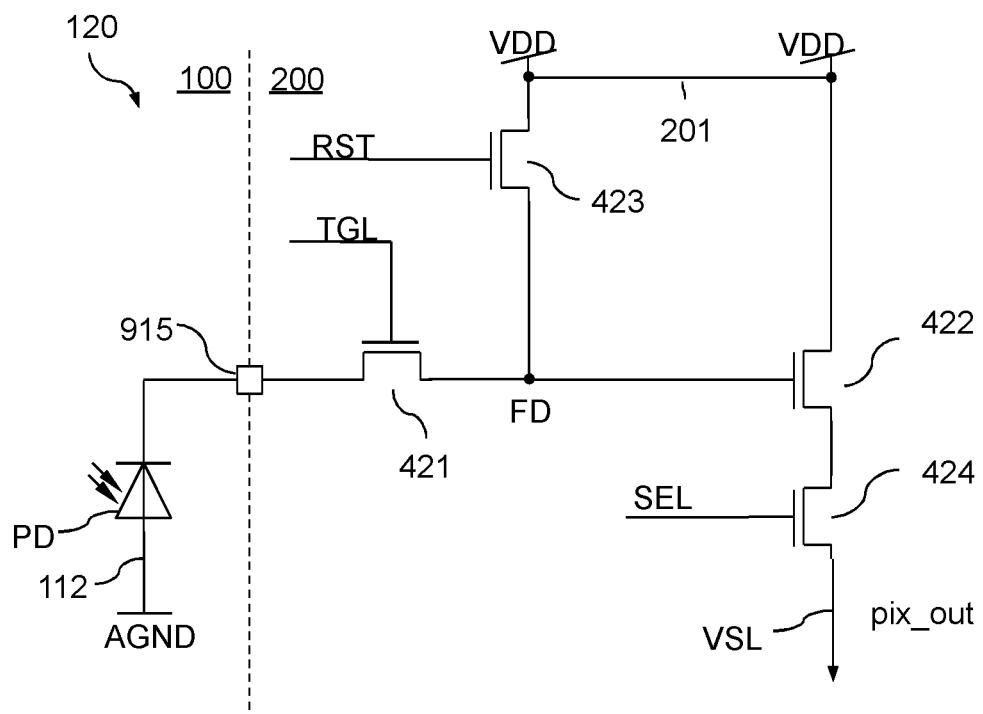

FIGS. 6A and 6B refer to active pixel modules providing a photoelectric conversion element PD and a pixel circuit 120 configured for an analog intensity read-out of the photoelectric conversion element PD.

The pixel circuit 120 includes an amplification transistor 422 and a transfer transistor 421, wherein a source/drain path of the amplification transistor 422 is electrically connected between the first supply line 101 and a vertical signal line VSL. A source/drain path of the transfer transistor 421 is electrically connected between the photoelectric conversion element PD and a gate of the amplification transistor 422.

The photoelectric conversion element PD photoelectrically converts incident radiation into electric charges (here, electrons). The amount of electric charge generated in the photoelectric conversion element PD corresponds to the amount of the incident radiation.

The transfer transistor 421 is connected between the photoelectric conversion element PD and a floating diffusion region FD. The transfer transistor 421 serves as a transfer element for transferring charge from the photoelectric conversion element PD to the floating diffusion region FD. The floating diffusion region FD serves as temporary local charge storage. A transfer signal TGL serving as a control signal is supplied to the gate of the transfer transistor 421 through a transfer control line.

Thus, the transfer transistor 421 may transfer electrons photoelectrically converted by the photoelectric conversion element PD to the floating diffusion FD.

A reset transistor 423 may be electrically connected between the floating diffusion FD and the first supply line 101 to which the positive supply voltage VDD is supplied. A reset signal RST serving as a control signal is supplied to the gate of the reset transistor 423 through a reset control line.

Thus, the reset transistor 423 serving as a reset element resets a potential of the floating diffusion FD to that of the first supply line 101.

The floating diffusion FD is connected to the gate of the amplification transistor 422 serving as an amplification element. That is, the floating diffusion FD functions as the input node of the amplification transistor 422.

The amplification transistor 422 and a selection transistor 424 may be electrically connected in series between the first supply line 101 and a vertical signal line VSL.

Thus, the amplification transistor 422 is connected to the signal line VSL through the selection transistor 424 and constitutes a source-follower circuit with a constant current source between the selection transistor 424 and a second supply line.

Then, a selection signal SEL serving as a control signal corresponding to an address signal is supplied to the gate of the selection transistor 424 through a selection control line, and the selection transistor 424 is turned on.

When the selection transistor 424 is turned on, the amplification transistor 422 amplifies the potential of the floating diffusion FD and outputs a voltage corresponding to the potential of the floating diffusion FD to the vertical signal line VSL. The vertical signal line VSL may transfer the analog pixel output signal pix_out from the pixel circuit 120 to an analog-to-digital converter circuit in the readout circuit 50 of FIG. 1.

Since the respective gates of the transfer transistor 421, the reset transistor 423, and the selection transistor 424 are, for example, connected in units of rows, these operations are simultaneously performed for each of the pixel circuits 120 of one row.

The analog pixel output signal pix_out on the vertical signal line VSL is a representation of the pixel output signals pix_out in FIG. 1. The pixel circuit 120 represents a complete active pixel module 32 as illustrated in FIG. 1.

In FIG. 6A the pixel circuit 120 represents an active pixel module formed completely on the pixel substrate 100. In other words, the pixel substrate 100 includes the active pixel modules 32 of FIG. 1. One through contact via 915 per pixel may pass the pixel output signal pix_out to a logic substrate 200.

The pixel circuit 120 of FIG. 6A may be combined with any of the protection circuits 130 as illustrated in FIGS. 3, 4 and 5 in the same light receiving apparatus, e.g., on the same pixel substrate 100.

In FIG. 6B only the photoelectric conversion element PD is formed on the pixel substrate 100. The pixel circuit 120 with the transfer transistor 421, the amplifier transistor 422, the reset transistor 423 and the selection transistor 424 may be completely formed on the logic substrate 200. One through contact via 915 may pass the charge accumulated on the cathode of the photoelectric conversion element PD to the logic substrate 200.

The logic substrate 200 may include a first supply rail 201, to which the positive supply voltage VDD is applied. One or more further through contact vias may pass the analog ground potential AGND between the substrate region 112 and a reference voltage rail of the logic substrate 200.

The pixel circuit 120 of FIG. 6B may be combined with any of the protection circuits 130 as illustrated in FIGS. 3, 4 and 5 in the same light receiving apparatus, e.g., on the same pixel substrate 100.

Figure 7:
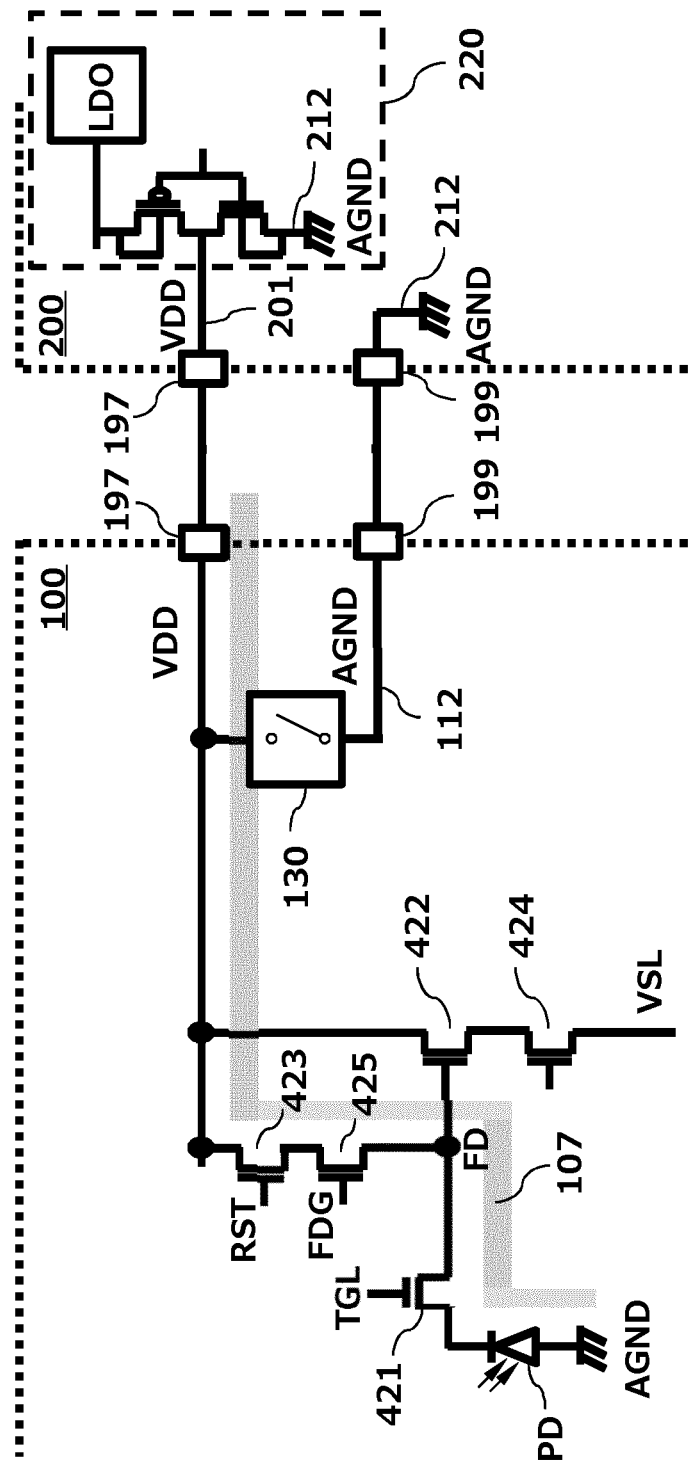
FIG. 7 is a simplified block/circuit diagram of a light receiving apparatus with a protection circuit according to the present disclosure.

FIG. 7 shows a pixel substrate 100 and a logic substrate 200 of a light receiving apparatus. The light receiving apparatus may be a solid-state imaging device or distance measuring apparatus, by way of example. The pixel substrate 100 includes a protection circuit 130 as described above and a pixel circuit 120 for intensity read-out with five transistors. In particular, the pixel circuit 120 includes a floating diffusion gate transistor 425 electrically connected between the reset transistor 423 and the floating diffusion FD.

The logic substrate 200 includes a voltage supply circuit 220 that generates a positive supply voltage VDD between a first supply rail 201 and a reference voltage rail 212. One or more first supply terminals 197 pass the positive supply voltage VDD from the logic substrate 200 to the pixel substrate 100. One or more reference voltage terminals 199 pass the analog ground potential AGND between the reference voltage rail 212 on the logic substrate 200 and the substrate region 112 of the pixel substrate 100.

The off-state charge carrier path 107 includes the source/drain paths of the reset transistor 423 and the floating diffusion gate transistor 425.

Figure 8A:
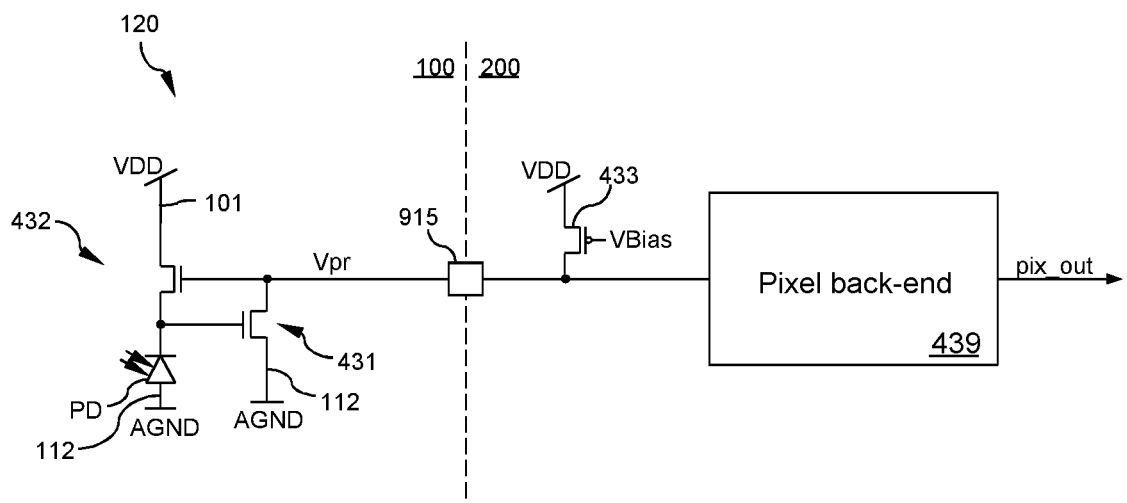
FIGS. 8A and 8B are simplified circuit diagrams of pixel circuits for detection of intensity changes that can be combined with a protection circuit according to the present disclosure.
Figure 8B:
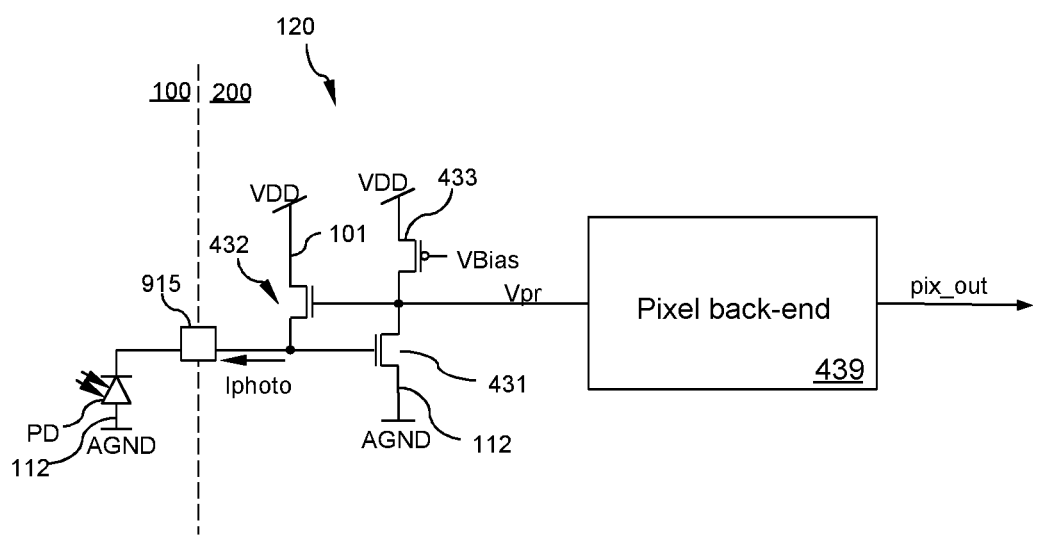

FIGS. 8A and 8B refer to active pixel modules configured for detecting intensity changes of the radiation impinging onto a photoelectric conversion element PD.

The pixel circuit 120 includes an amplifier portion 431 and a feedback portion 432, wherein a controllable current path of the feedback portion 432 is electrically connected between the first supply line 101 and the photoelectric conversion element PD. A controllable current path of the amplifier portion 431 is electrically connected between a control input of the feedback portion 432 and the substrate region 112. A load element 433 is electrically connected between the first supply line 101 and the controllable current path of the amplifier portion 431.

The amplifier portion 431 may include or consist of an inverting amplifier element, e.g. an n-channel MOSFET. Alternatively, the amplifier portion 431 may include an amplifier circuit with more than one transistor. In particular, the amplifier portion 431 may be configured as common source amplifier circuit.

An output of the amplifier portion 431 supplies a photoreceptor signal Vpr and feeds back to the input of the amplifier portion 431 through the feedback portion 432. The feedback portion 432 may include or consist of an amplifier element, e.g. an n-channel MOSFET in source-follower configuration. Alternatively, the feedback portion 432 may include a p-channel MOSFET with fixed gate bias or a feedback circuit with more than one element.

The feedback portion 432 includes a controlled path, wherein a current through the controlled path is controlled in response to the feedback signal. The amplifier portion 431 and the feedback portion 432 define a predetermined current-to-voltage transfer characteristic. According to an example, the predetermined current-to-voltage transfer characteristic may be a logarithmic current-to-voltage transfer characteristic.

An input of the pixel circuit 120 is electrically connected to the photoelectric conversion element PD. For example, the controlled path of the feedback portion 432 and the photoelectric conversion element PD may be electrically connected in series between the first supply line 101 and the analog ground potential AGND.

In particular, the feedback portion 432 may include an n-channel feedback MOSFET. A source of the feedback MOSFET is connected to a cathode of the photoelectric conversion element PD. An anode of the photoelectric conversion element PD is electrically connected to analog ground potential AGND and may be formed by a substrate region 112. The amplifier portion 431 may include a common source amplifier including a n-channel amplifier MOSET and a load element 433. The source of the amplifier MOSFET is electrically connected to analog ground potential AGND. The load element 433 is electrically connected between the first supply potential VDD and the drain of the amplifier MOSFET. The load element 433 may include the controlled path of a p-channel load MOSFET with the gate electrically connected to a bias potential Vbias. The bias potential Vbias may be fixed.

A pixel back-end 439 of the pixel circuit 120 detects when a change of the photoreceptor signal Vpr with respect to a previously indicated state exceeds an upper threshold and/or falls below a lower threshold. The pixel back-end 439 outputs a digital pixel output signal pix_out indicating whether or not a voltage level of the photoreceptor signal Vpr has changed to a degree that the difference between the current voltage level of the photoreceptor signal Vpr and the previously indicated voltage level of the photoreceptor signal Vpr falls below a predefined lower threshold or exceeds an upper threshold.

In FIG. 8A the pixel substrate 100 includes the photoelectric conversion element PD and the n-channel MOSFETs of the active pixel module. A pixel circuit 120 on the pixel substrate 100 includes the n-channel feedback MOSFET and the n-channel amplifier MOSFET. The logic substrate 200 includes the p-channel load MOSFET and the pixel back-end 439. One through contact via 915 per pixel passes the photoreceptor signal Vpr from the pixel substrate 100 to the logic substrate 200.

For example, the pixel substrate 100 may include a p-type substrate and formation of p-channel MOSFETs may imply the formation of n-doped wells separating the p-type source and drain regions of the p-channel MOSFETs from each other and from further p-type regions. Avoiding the formation of p-channel MOSFETs may therefore simplify the manufacturing process of the pixel substrate 100.

The pixel circuit 120 of FIG. 8A may be combined with any of the protection circuits 130 as illustrated in FIGS. 3, 4, and 5 in the same light receiving apparatus, e.g., on the same pixel substrate 100.

In FIG. 8B the pixel substrate 100 includes the photoelectric conversion element PD. The logic substrate 200 includes the n-channel MOSFETs, the p-channel load MOSFET and the pixel back-end 439. For each pixel, one single through contact via 915 passes the photocurrent Iphoto from the pixel substrate 100 to the logic substrate 200.

Figure 9:
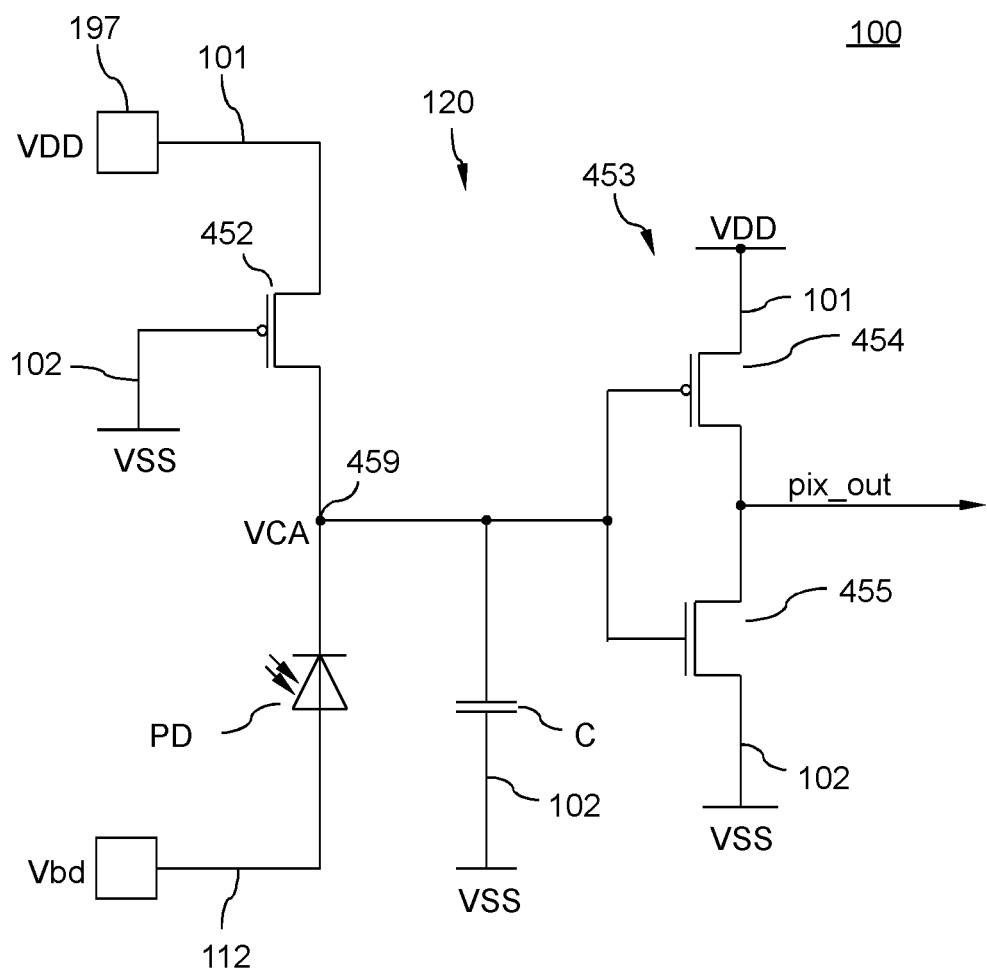
FIG. 9 is a simplified circuit diagram of a pixel circuit for event detection that can be combined with a protection circuit according to the present disclosure.

FIG. 9 refers to an active pixel module configured to detect single events, in particular for measuring a time period between a starting event and reception of radiation in the photoelectric conversion element PD.

The photoelectric conversion element PD may be an element generating a signal in response to reception of photons, for example, an SPAD (Single Photon Avalanche Diode) element. Specifically, a light receiving apparatus according to the present embodiment is configured such that the photoelectric conversion element PD of each pixel includes an SPAD element. Note that the light receiving element is not limited to the SPAD element and may be any of various elements such as an APD (Avalanche Photo Diode) and a CAPD (Current Assisted Photonic Demodulator).

The pixel circuit 120 may include a complete active pixel module for event detection with the source/drain path of a p-channel quenching MOSFET 452 and the photoelectric conversion element PD electrically connected in this order in series between the first supply line 101 and the substrate region 112 that forms the anode of the photoelectric conversion element PD.

The node 459 between the quenching MOSFET 452 and the cathode of the photoelectric conversion element PD is electrically connected to the input of an inverting amplifier stage 453. The inverting amplifier stage 453 may be a CMOS inverter with the source/drain path of a p-channel inverter stage MOSFET 454 and the source/drain path of an n-channel inverter stage MOSFET 455 electrically connected in this order in series between the first supply line 101 and a second supply line 102. The inverting amplifier stage 453 outputs a digital pixel output signal pix_out. The raising edge of the pixel output signal pix_out indicates the start of receiving radiation.

A capacitive element C may be connected between the input of the inverting amplifier stage 453 and the second supply line 102.

A positive first supply voltage VDD applied to the first supply line 101, a second supply voltage VSS (0V) applied to the second supply line 102 and a (negative) anode voltage applied to the substrate region 112 of the photoelectric conversion element PD power on the pixel circuit 120.

The anode voltage is selected such that a resulting reverse bias voltage across the photoelectric conversion element PD may be nearly as high as, equal to or slightly higher than a breakdown voltage of the photoelectric conversion element PD. For example, the reverse bias voltage may exceed the breakdown voltage by an excess voltage of approximately 2 V to 5 V such that the photoelectric conversion element PD operates in a region referred to as a Geiger mode in a region with no DC stability point.

A fixed voltage biases the gate of the p-channel quenching MOSFET 452 which is operated as passive load for the photoelectric conversion element PD. For example, the gate of the quenching MOSFET 452 may be electrically connected to the second supply line 102 (VSS).

In the absence of radiation, no current flows through the photoelectric conversion element PD and the p-channel quenching MOSFET 452 acting as passive high resistive load sets the potential at the node 459 to the supply voltage VDD and the inverting amplifier stage 455 outputs a low-level pixel output signal pix_out.

A single photon received in the photoelectric conversion element PD generates an electron/hole pair that triggers avalanche multiplication in the photoelectric conversion element PD. With the rapidly increasing avalanche current through the photoelectric conversion element PD, the electric potential at the node 459 rapidly decreases to below the threshold of the inverting amplifier stage 453. The level of the pixel output signal pix_out changes from close to 0V to close to VDD. With further increasing avalanche current the voltage drop across the quenching MOSFET 452 gets high enough such that the reverse bias voltage across the photoelectric conversion element PD drops to below the reverse voltage required for maintaining the avalanche breakdown. The avalanche current through the photoelectric conversion element PD ceases. The photoelectric conversion element PD returns to the initial state, the potential at node 459 rises to above the threshold of the inverting amplifier circuit 453 and the level of the pixel output signal pix_out returns to close to 0V.

A light receiving apparatus may combine a plurality of pixel circuits 120 as illustrated in FIG. 9 with any of the protection circuits 130 of FIGS. 3, 4 and 5.

The protection circuit 130 may include at least two laterally separated parts 439 electrically arranged in parallel.

Figure 10A:
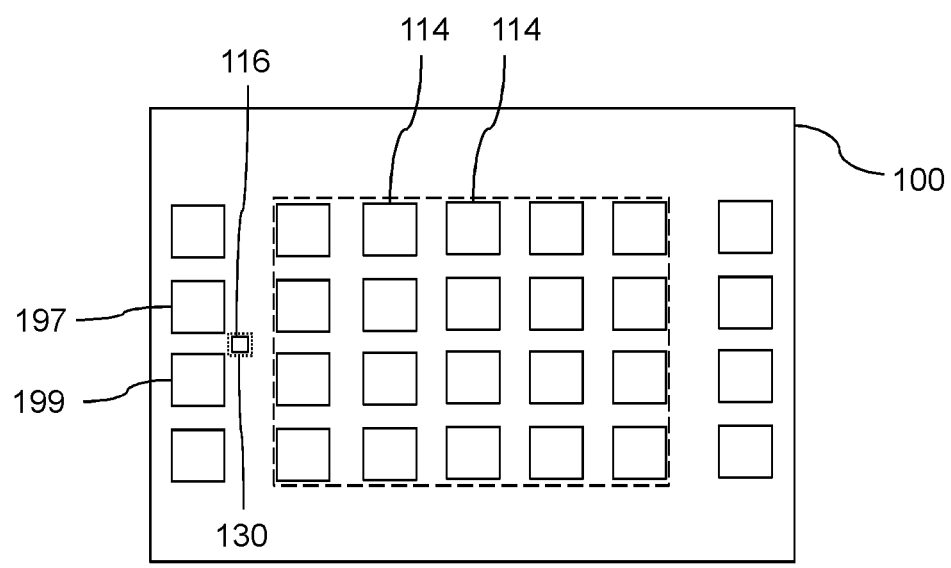
FIGS. 10A and 10B are schematic plan views of pixel substrates with photoelectric current sources for protection circuits according to the present disclosure.
Figure 10B:
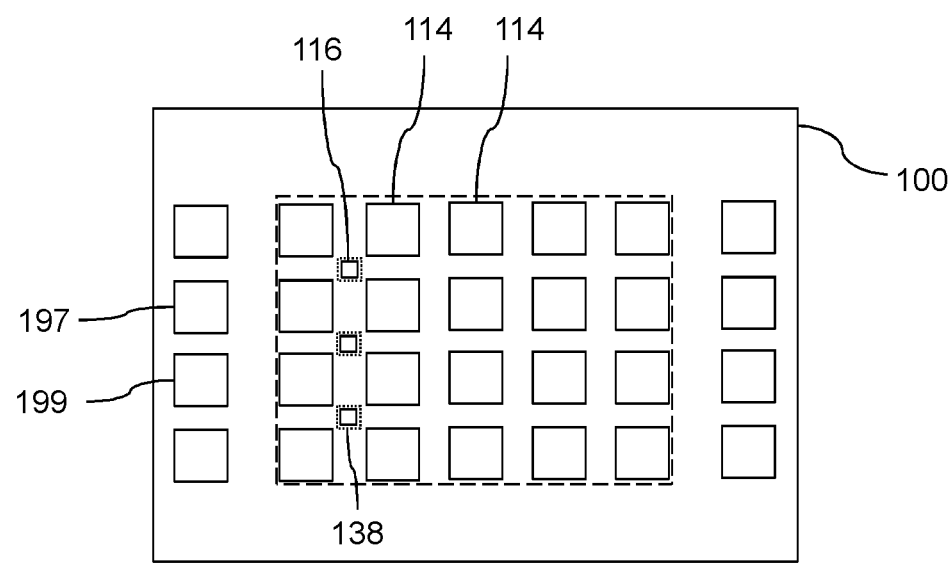

FIGS. 10A-10B are top views onto planar main surfaces of pixel substrates 100. Each main surface includes a plurality of detection areas 114 of active pixels arranged in a matrix. A first supply terminal 197 and a voltage reference terminal 199 are formed along an edge of the main surface. A protection circuit 130 includes a photodiode element with a photosensitive area 116. The photosensitive area 116 may be smaller than a detection area 114.

In FIG. 10A the photodiode element 132 with the photosensitive area 116 is formed outside a smallest rectangular area including all detection areas 114. The protection circuit 130 is formed in the vicinity of the first supply terminal 197 and the voltage reference terminal 199.

In FIG. 10B the protection circuit 130 includes a plurality of laterally separated photodiode elements 132 with the photosensitive areas 116 formed between the detection areas 114 and within a smallest rectangular area including all detection areas 114.

Figure 11:
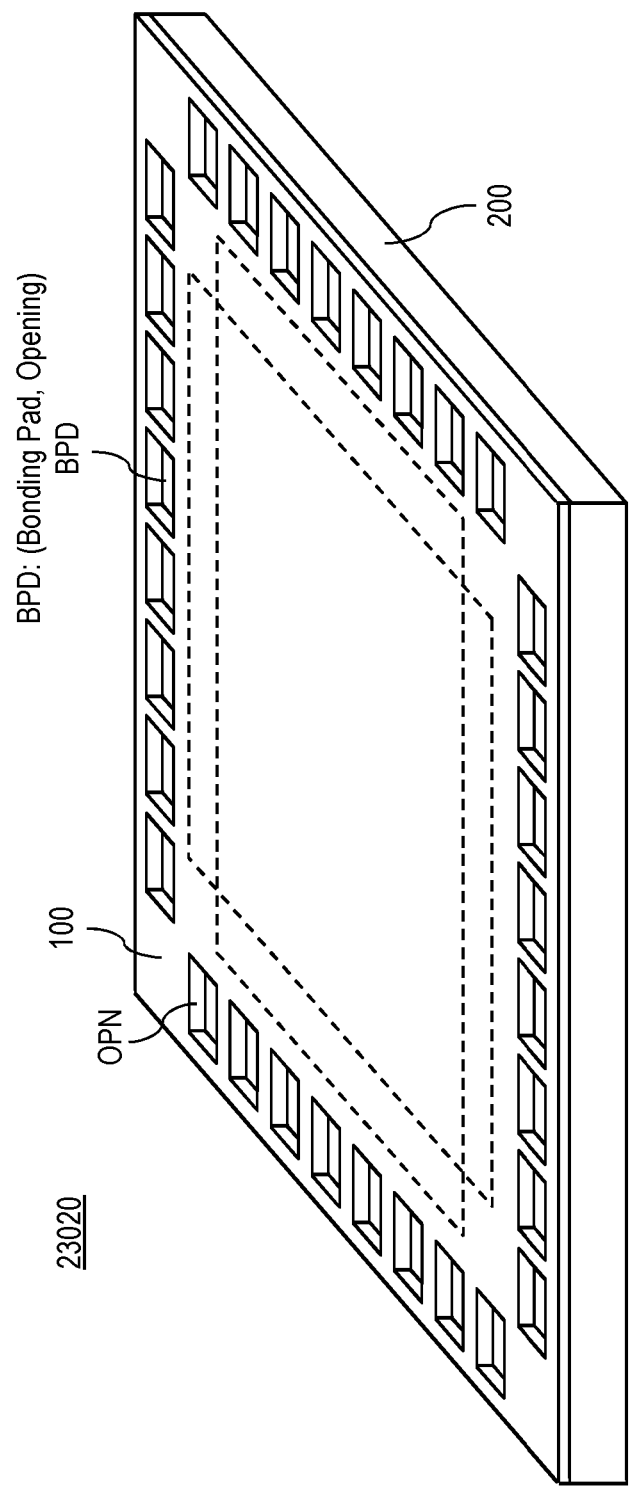
FIG. 11 is a simplified perspective view of a solid-state imaging device with laminated structure according to an embodiment of the present disclosure.

FIG. 11 is a perspective view showing an example of a laminated structure of a light receiving apparatus, e.g. a solid-state imaging device 23020 with a plurality of active pixels arranged matrix-like in array form. Each pixel has at least one photoelectric conversion element.

The solid-state imaging device 23020 has the laminated structure of a pixel substrate (upper chip) 100 and a logic substrate (lower chip) 200.

The laminated pixel and logic substrates 100 and 100 may be electrically connected to each other through TC(S)Vs (Through Contact (Silicon) Vias) formed in the pixel substrate 100.

The solid-state imaging device 23020 may be formed to have the laminated structure in such a manner that the pixel substrate 100 and the logic substrate 200 are bonded together at a wafer level and cut out by dicing.

In the laminated structure of the upper and lower two chips, the pixel substrate 100 may be an analog chip (sensor chip) including at least one analog component of each pixel, e.g., the photoelectric conversion elements arranged in array form. For example, the pixel substrate 100 may include only the photoelectric conversion elements. Alternatively, the pixel substrate 100 may include, in addition to the photoelectric conversion element one, two, three or four of the active elements (transfer transistor TG, reset transistor RST, amplification transistor AMO, and selection transistor SEL) of each active pixel.

The pixel substrate 100 may further include one or more protection circuits as described above. For example, the pixel substrate 100 may include, from the protection circuit, only the photoelectric current source. Alternatively, the pixel substrate 100 may include, in addition to the photoelectric current source one, two, three or four of the further active elements of the protection circuit.

The pixel substrate 100 may also include logic circuits. For example, the pixel substrate 100 may include portions of an analog-to-digital converter (ADC), e.g. at least one of a comparator, a counter, a current source and a DAC (digital-to-analog converter), may include parts of the comparator, or may include the complete ADC for each column of pixel circuits. The pixel substrate 100 may also include at least portions of the address/driver unit 40, the readout circuit 50 and the controller 60 and/or at least portions of the data processing circuit 70 as illustrated in FIG. 1.

The logic substrate 200 may be mainly a logic chip (digital chip) that includes the elements complementing the circuits on the pixel substrate 100 to the solid-state imaging device 23020. The logic substrate 200 may also include analog circuits, for example circuits that quantize analog signals transferred from the pixel substrate 100 through the TCVs and to a signal processing circuit.

The logic substrate 200 may have one or more bonding pads BPD and the pixel substrate 100 may have openings OPN for use in wire-bonding to the logic substrate 200.

The solid-state imaging device 23020 with the laminated structure of the pixel substrate 100 and the logic substrate 200 may have the following characteristic configuration.

The electrical connection between the pixel substrate 100 and the logic substrate 200 is performed through, for example, the TCVs. The TCVs may be arranged at chip ends or between a pad region and a circuit region. The TCVs for transmitting control signals and supplying power are mainly concentrated at, for example, the four corners of the solid-state imaging device 23020, by which a signal wiring area of the pixel substrate 100 can be reduced.

Figure 12:
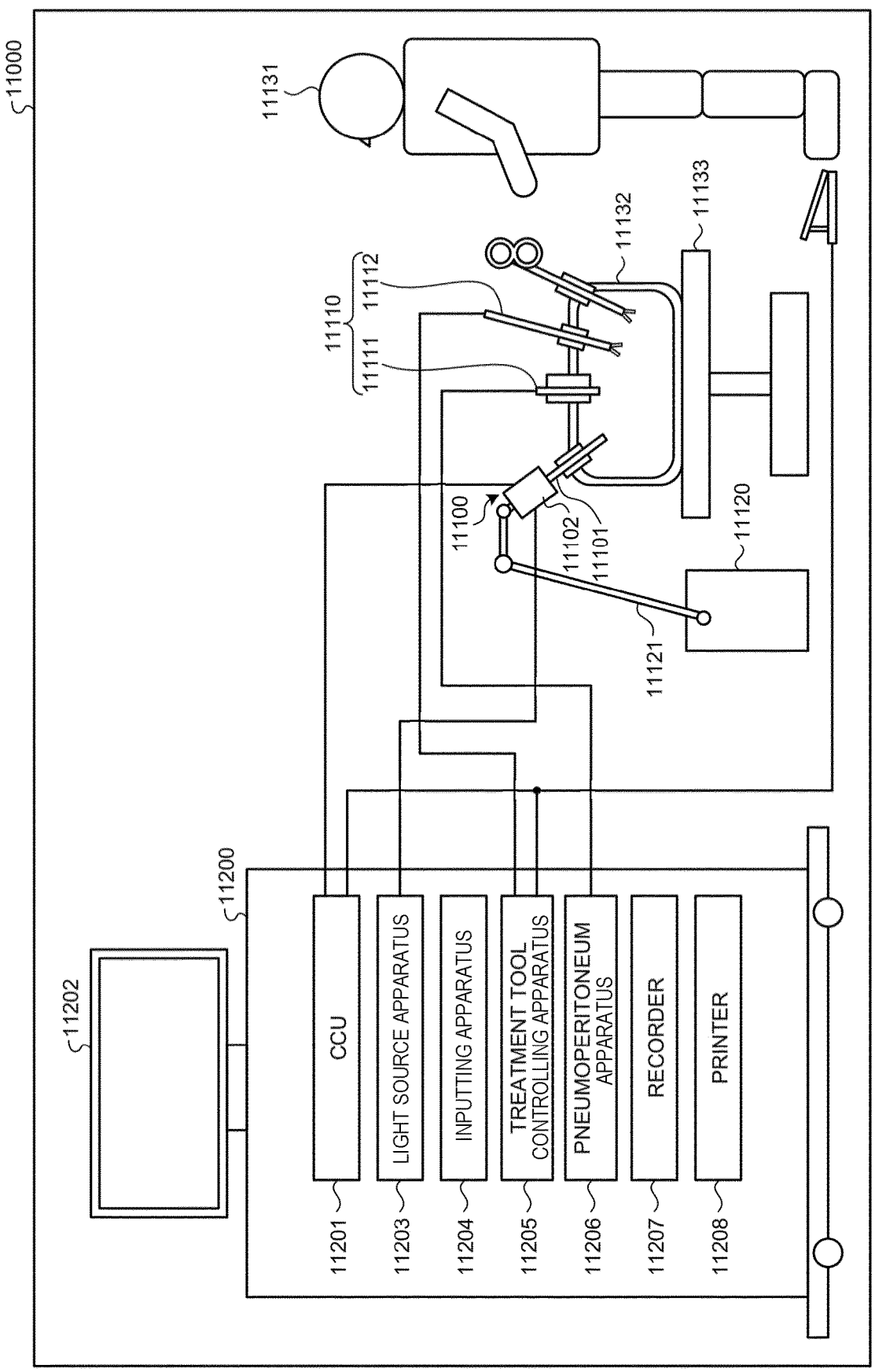
FIG. 12 is a view depicting an example of a schematic configuration of an endoscopic surgery system according to the present disclosure.

FIG. 12 is a view depicting an example of a schematic configuration of an endoscopic surgery system to which the technology according to an embodiment of the present disclosure (present technology) can be applied.

In FIG. 12, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element (solid-state imaging device) are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

The example of the endoscopic surgery system to which the technology according to an embodiment of the present disclosure is applied has been described above.

The technology according to the present disclosure may also be realized as a light receiving device mounted in a mobile body of any type such as automobile, electric vehicle, hybrid electric vehicle, motorcycle, bicycle, personal mobility, airplane, drone, ship, or robot.

Figure 13:
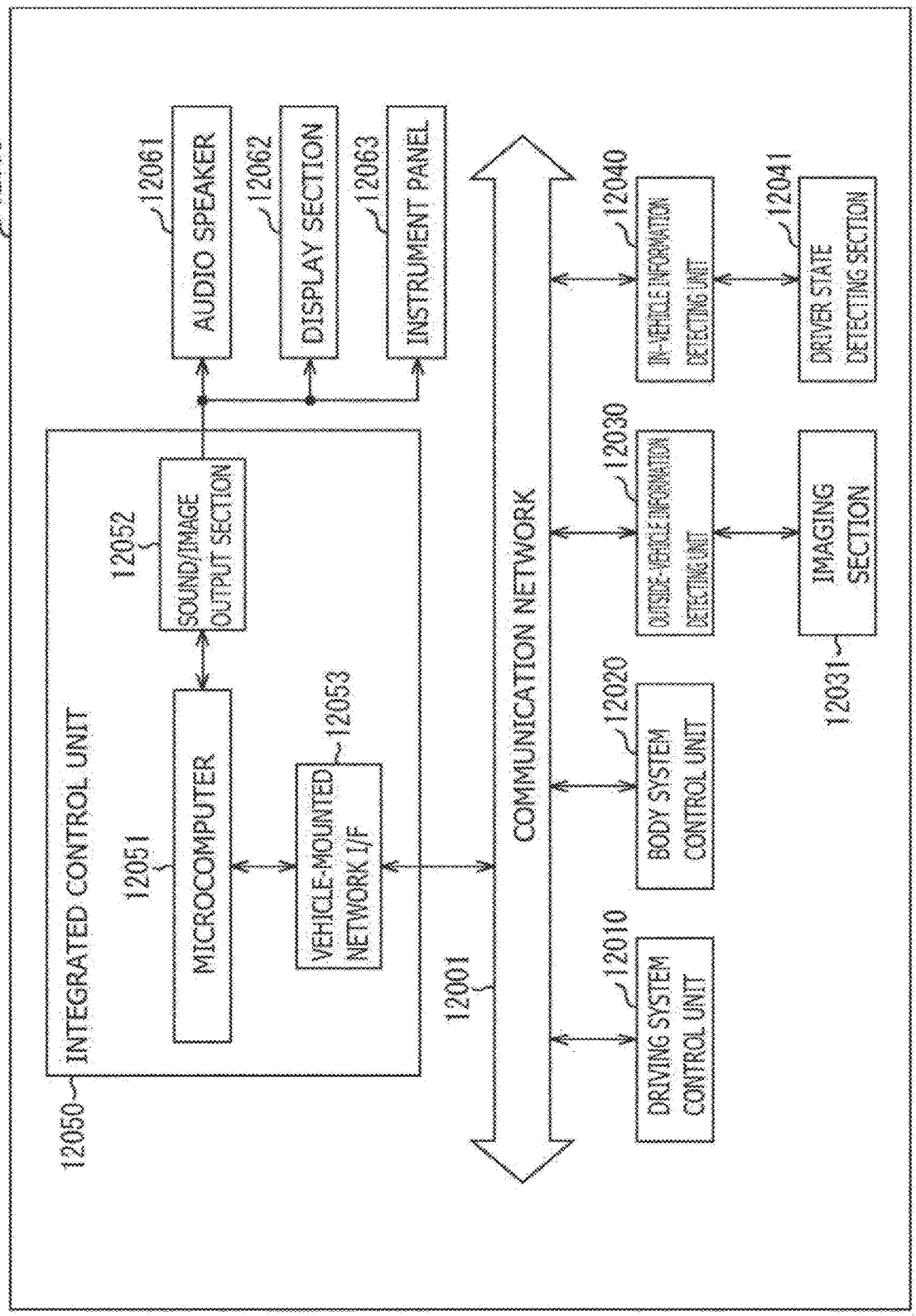
FIG. 13 is a block diagram depicting an example of a schematic configuration of a vehicle control system.

FIG. 13 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 13, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may include a light receiving apparatus according to the embodiments of the present disclosure. The imaging section 12031 receives light, and outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 13, an audio speaker 12061, a display section 12062, and an instrument panel 12063 are illustrated as the output device. The display section 12062 may, for example, include at least one of an on-board display or a head-up display.

Figure 14:
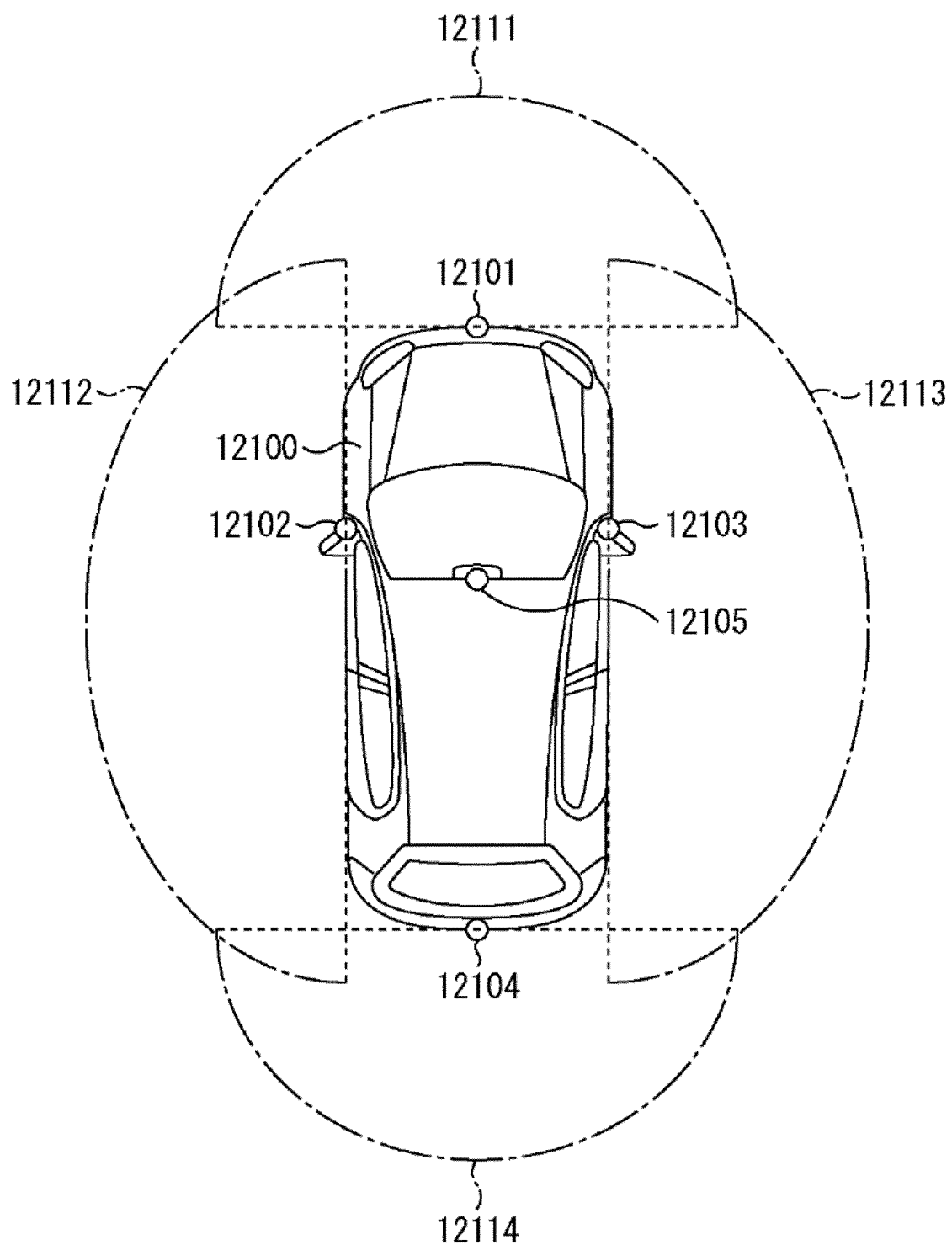
FIG. 14 is a diagram of assistance in explaining an example of installation positions of an outside-vehicle information detecting section and an imaging section of the vehicle control system of FIG. 13.

FIG. 14 is a diagram depicting an example of the installation position of the imaging section 12031.

In FIG. 14, the imaging section 12031 includes imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection or event detection as described with reference to FIG. 9.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above.

Additionally, embodiments of the present technology are not limited to the above-described embodiments, but various changes can be made within the scope of the present technology without departing from the gist of the present technology.

Note that the present technology can also be configured as described below:

(1) A pixel substrate, including:
a photoelectric conversion element including a doped region and a substrate region, wherein the doped region and the substrate region form a pn junction;
a pixel circuit electrically connected to a first supply line and the photoelectric conversion element, and
a protection circuit configured to short-circuit the first supply line and the substrate region when a voltage difference between the first supply line and the substrate region falls below a negative threshold voltage.

(2) The pixel substrate according to (1), further including:
a voltage reference terminal, wherein the substrate region and the voltage reference terminal are electrically connected through a low-resistive ohmic connection.

(3) The pixel substrate according to any of (1) or (2), wherein the pixel circuit is electrically connected to a second supply line and wherein the second supply line and the substrate region are electrically disconnected.

(4) The pixel substrate according to any of (1) to (3), wherein the protection circuit includes a photoelectric current source and a main transistor circuit with a switchable current path between the first supply line and the substrate region, and wherein the photoelectric current source is configured to switch on the switchable current path when a voltage difference between the first supply line and the substrate region falls below the negative threshold voltage.

(5) The pixel substrate according to (4), wherein the photoelectric current source includes a photodiode element.

(6) The pixel substrate according to (5), wherein a total horizontal area of the photodiode element is smaller than a total horizontal area of the photoelectric conversion element.

(7) The pixel substrate according to any of (4) to (6), wherein the protection circuit includes an auxiliary transistor circuit configured to switch off the switchable current path when a voltage difference between the first supply line and the substrate region is above the negative threshold voltage.

(8) The pixel substrate according to (7), wherein the main transistor circuit includes a first field effect transistor, wherein the auxiliary transistor circuit includes a second field effect transistor, and wherein the first and second field effect transistors have a same channel type.

(9) The pixel substrate according to (8), wherein the first field effect transistor and the second field effect transistor are p-channel MOSFETs, wherein the photoelectric current source is electrically connected between a gate of the first field effect transistor and the substrate region, wherein a source/drain path of the second field effect transistor is electrically connected between the first supply line and the gate of the first field effect transistor, and wherein a gate of the second field effect transistor is electrically connected to the substrate region.

(10) The pixel substrate according to any of (1) to (9), wherein the pixel substrate includes a plurality of photoelectric conversion elements and pixel circuits.

(11) The pixel substrate according to any of claims (1) to (10),
wherein the pixel circuit includes an amplification transistor and a transfer transistor, wherein a source/drain path of the amplification transistor is electrically connected between the first supply line and a vertical signal line, and
wherein a source/drain path of the transfer transistor is electrically connected between the photoelectric conversion element and a gate of the amplification transistor.

(12) The pixel substrate according to any of (1) to (11), wherein the active pixel circuit includes an amplifier portion and a feedback portion, wherein a controllable current path of the feedback portion is electrically connected between the first supply line and the photoelectric conversion element, wherein a controllable current path of the amplifier portion is electrically connected between a control input of the feedback portion and the substrate region, and wherein a load element is electrically connected between the first supply line and the controllable current path of the amplifier portion.

(13) The pixel substrate according to any of (1) to (12), wherein the protection circuit includes at least two laterally separated parts electrically arranged in parallel.

(14) A light receiving apparatus, including:
a photoelectric conversion element including a doped region and a substrate region, wherein the doped region and the substrate region form a pn junction;
a pixel circuit electrically connected to a first supply line and the photoelectric conversion element, and
a protection circuit configured to short-circuit the first supply line and the substrate region when a voltage difference between the first supply line and the substrate region falls below a negative threshold voltage.

(15) The light receiving apparatus according (14), wherein the protection circuit includes a photoelectric current source and a main transistor circuit with a switchable current path between the first supply line and the substrate region, wherein the photoelectric current source is configured to turn on the switchable current path when a voltage difference between the first supply line and the substrate region falls below the negative threshold voltage, and
wherein the photoelectric current source is formed on a pixel substrate.

The invention claimed is:

1. A pixel substrate, comprising:
a photoelectric conversion element (PD) comprising a doped region and a substrate region, wherein the doped region and the substrate region form a pn junction;
a pixel circuit electrically connected to a first supply line and the photoelectric conversion element (PD), and
a protection circuit including a photoelectric current source and a main transistor circuit with a switchable current path between the first supply line and the substrate region, and wherein the photoelectric current source is configured to switch on the switchable current path to short-circuit the first supply line and the substrate region when a voltage difference between the first supply line and the substrate region falls below a negative threshold voltage.

2. The pixel substrate according to claim 1, further comprising:
a voltage reference terminal, wherein the substrate region and the voltage reference terminal are electrically connected through a low-resistive ohmic connection.

3. The pixel substrate according to claim 1,
wherein the pixel circuit is electrically connected to a second supply line and wherein the second supply line and the substrate region are electrically disconnected.

4. The pixel substrate according to claim 1,
wherein the photoelectric current source comprises a photodiode element.

5. The pixel substrate according to claim 4,
wherein a total horizontal area of the photodiode element is smaller than a total horizontal area of the photoelectric conversion element (PD).

6. The pixel substrate according to the claim 1,
wherein the protection circuit comprises an auxiliary transistor circuit configured to switch off the switchable current path when a voltage difference between the first supply line and the substrate region is above the negative threshold voltage.

7. The pixel substrate according to claim 6,
wherein the main transistor circuit comprises a first field effect transistor, wherein the auxiliary transistor circuit comprises a second field effect transistor, and wherein the first and second field effect transistors have a same channel type.

8. The pixel substrate according to claim 7,
wherein the first field effect transistor and the second field effect transistor are p-channel MOSFETs, wherein the photoelectric current source is electrically connected between a gate of the first field effect transistor and the substrate region, wherein a source/drain path of the second field effect transistor is electrically connected between the first supply line and the gate of the first field effect transistor, and wherein a gate of the second field effect transistor is electrically connected to the substrate region.

9. The pixel substrate according to claim 8, wherein the photoelectric current source comprises a photodiode element, wherein an anode of the photodiode element is electrically connected to the substrate region and a cathode of the photodiode element is electrically connected with the gate of the first field effect transistor.

10. The pixel substrate according to claim 1,
wherein the pixel substrate comprises a plurality of photoelectric conversion elements (PD) and pixel circuits.

11. The pixel substrate according to claim 1,
wherein the pixel circuit comprises an amplification transistor and a transfer transistor, wherein a source/drain path of the amplification transistor is electrically connected between the first supply line and a vertical signal line (VSL), and wherein a source/drain path of the transfer transistor is electrically connected between the photoelectric conversion element (PD) and a gate of the amplification transistor.

12. The pixel substrate according to claim 1,
wherein the pixel circuit comprises an amplifier portion and a feedback portion, wherein a controllable current path of the feedback portion is electrically connected between the first supply line and the photoelectric conversion element (PD), wherein a controllable current path of the amplifier portion is electrically connected between a control input of the feedback portion and the substrate region, and wherein a load element is electrically connected between the first supply line and the controllable current path of the amplifier portion.

13. The pixel substrate according to claim 1,
wherein the protection circuit comprises at least two laterally separated parts electrically arranged in parallel.

14. The pixel substrate according to claim 1, wherein the protection circuit is self-powered by the photoelectric current source.

15. The pixel substrate according to claim 1, wherein the protection circuit is configured to limit a quiescent voltage between the first supply line and the substrate region to a voltage smaller than 100 mV when the pixel substrate is powered off and radiation impinges on the photoelectric conversion element.

16. A light receiving apparatus, comprising:
a photoelectric conversion element (PD) comprising a doped region and a substrate region, wherein the doped region and the substrate region form a pn junction;
a pixel circuit electrically connected to a first supply line and the photoelectric conversion element (PD), and
a protection circuit configured to short-circuit the first supply line and the substrate region when a voltage difference between the first supply line and the substrate region falls below a negative threshold voltage,
wherein the protection circuit comprises a photoelectric current source and a main transistor circuit with a switchable current path between the first supply line and the substrate region, wherein the photoelectric current source is configured to turn on the switchable current path when a voltage difference between the first supply line and the substrate region falls below the negative threshold voltage, and
wherein the photoelectric current source is formed on a pixel substrate.

17. The light receiving apparatus according to claim 16, wherein the photoelectric current source comprises a photodiode element, and wherein a total horizontal area of the photodiode element is smaller than a total horizontal area of the photoelectric conversion element (PD).

18. The light receiving apparatus according to claim 16, wherein the voltage difference between the first supply line and the substrate region falls below the negative threshold voltage when the light receiving apparatus is powered off and radiation impinges on the photoelectric conversion element (PD).

19. The light receiving apparatus according to claim 16, wherein the protection circuit comprises an auxiliary transistor circuit configured to switch off the switchable current path when a voltage difference between the first supply line and the substrate region is above the negative threshold voltage.

20. The light receiving apparatus according to claim 19, wherein the main transistor circuit comprises a first field effect transistor, wherein the auxiliary transistor circuit comprises a second field effect transistor, and wherein the first and second field effect transistors have a same channel type.

* * * * *